United States Patent [19]

Tai et al.

[11] Patent Number: 5,258,849
[45] Date of Patent: Nov. 2, 1993

[54] HALFTONE DOT ARRANGEMENT IN GRAY LEVEL HALFTONE PRINTING

[75] Inventors: Hwai-Tzuu Tai, Rochester; Yee S. Ng, Fairport, both of N.Y.

[73] Assignee: Eastman Kodak Company, Rochester, N.Y.

[21] Appl. No.: 894,857

[22] Filed: Jun. 5, 1992

[51] Int. Cl.⁵ .............................................. H04N 1/23
[52] U.S. Cl. .................................... 358/298; 358/457; 358/459
[58] Field of Search .............. 358/300, 296, 298, 455, 358/456, 457, 458, 459, 462; 346/108, 160, 1.1

[56] References Cited

U.S. PATENT DOCUMENTS

| | | | |
|---|---|---|---|
| 4,412,226 | 10/1983 | Yoshida | 346/1.1 |
| 4,736,254 | 4/1988 | Kotera | 358/298 |
| 5,075,780 | 12/1991 | Shibahara | 358/298 |

Primary Examiner—Edward L. Coles, Sr.
Assistant Examiner—Scott A. Rogers
Attorney, Agent, or Firm—Norman Rushefsky

[57] ABSTRACT

A method and apparatus for reproducing an original image, having a scanner which scans and digitizes the original image into pixels, a controller coupled to the scanner to receive the digitized original image, and which produces a first signal corresponding to a gray level halftoned representation of the digitized original image, and a printer coupled to the controller to receive the first signal and which produces a gray level halftoned reproduction of the original image. The controller groups the pixels into cells that each have a determined cell gray level, and controls the formation of dots within the pixels of an individual cell by the printer such that for each increase in cell gray level, a dot at at least one of the pixels in the cell forms to a larger dot-size. Sequential forming of the dots occurs at the pixels in the cell in a pre-defined order such that each dot is formed to a first dot-size less than a maximum dot-size before beginning the formation of a dot at another pixel within the cell. When all of the dots in the cell have been formed to the first dot-size corresponding to a specific cell gray level, the dot-size of each of the dots is increased in the pre-defined order to a second dot-size, corresponding to increasing cell gray levels.

2 Claims, 6 Drawing Sheets

30

| | LEVEL 1 | | |
|---|---|---|---|
| 43 | 36 | 22 | 8 |
| 15 | ① | 29 | 50 |
| 22 | 8 | 43 | 36 |
| 29 | 50 | 15 | 1 |

| | LEVEL 2 | | |
|---|---|---|---|
| 44 | 37 | 23 | 9 |
| 16 | 2 | 30 | 51 |
| 23 | 9 | 44 | 37 |
| 30 | 51 | 16 | 2 |

| | LEVEL 3 | | |
|---|---|---|---|
| 45 | 38 | 24 | 10 |
| 17 | 3 | 31 | 52 |
| 24 | 10 | 45 | 38 |
| 31 | 52 | 17 | 3 |

| | LEVEL 4 | | |
|---|---|---|---|
| 46 | 39 | 25 | 11 |
| 18 | 4 | 32 | 53 |
| 25 | 11 | 46 | 39 |
| 32 | 53 | 18 | 4 |

| | LEVEL 5 | | |
|---|---|---|---|
| 47 | 40 | 26 | 12 |
| 19 | 5 | 33 | 54 |
| 26 | 12 | 47 | 40 |
| 33 | 54 | 19 | 5 |

| | LEVEL 6 | | |
|---|---|---|---|
| 48 | 41 | 27 | 13 |
| 20 | 6 | 34 | 55 |
| 27 | 13 | 48 | 41 |
| 34 | 55 | 20 | 6 |

| | LEVEL 7 | | |
|---|---|---|---|
| 49 | 42 | 28 | 14 |
| 21 | 7 | 35 | 56 |
| 28 | 14 | 49 | 42 |
| 35 | 56 | 21 | 7 |

| 7 | 6 | 4 | 2 |
| 3 | 1 | 5 | 8 |
| 4 | 2 | 7 | 6 |
| 5 | 8 | 3 | 1 |

```
         34
            LEVEL 1
         7   6   4   2
         3  ①   5   8
         4   2   7   6
         5   8   3   1

LEVEL 2
        15  14  12  10
        [11] [9] [13] 16
        [12] [10] 15  14
        13  16  11   9

LEVEL 3
        23  22  20  18
        19  17  21  24
        20  18  23  22
        21  24  19  17

LEVEL 4
        31  30  28  26
        27  25  29  32
        28  26  31  30
        29  32  27  25
```

```
            LEVEL 5
        39  38  36  34
        35  33  37  40
        36  34  39  38
        37  40  35  33

LEVEL 6
        47  46  44  42
        43  41  45  48
        44  42  47  46
        45  48  43  41

LEVEL 7
        55  54  52  50
        51  49  53  56
        52  50  55  54
        53  56  51  49
```

FIG. 6

| LEVEL 1 | | | |
|---|---|---|---|
| 31 | 26 | 16 | 6 |
| 11 | ① | 21 | 36 |
| 16 | 6 | 31 | 26 |
| 21 | 36 | 11 | 1 |

| LEVEL 2 | | | |
|---|---|---|---|
| 32 | 27 | 17 | 7 |
| 12 | 2 | 22 | 37 |
| 17 | 7 | 32 | 27 |
| 22 | 37 | 12 | 2 |

| LEVEL 3 | | | |
|---|---|---|---|
| 33 | 28 | 18 | 8 |
| 13 | 3 | 23 | 38 |
| 18 | 8 | 33 | 28 |
| 23 | 38 | 13 | 3 |

| LEVEL 4 | | | |
|---|---|---|---|
| 34 | 29 | 19 | 9 |
| 14 | 4 | 24 | 39 |
| 19 | 9 | 34 | 29 |
| 24 | 39 | 14 | 4 |

| LEVEL 5 | | | |
|---|---|---|---|
| 35 | 30 | 20 | 10 |
| 15 | 5 | 25 | 40 |
| 20 | 10 | 35 | 30 |
| 25 | 40 | 15 | 5 |

| LEVEL 6 | | | |
|---|---|---|---|
| 47 | 46 | 44 | 42 |
| 43 | 41 | 45 | 48 |
| 44 | 42 | 47 | 46 |
| 45 | 48 | 43 | 41 |

| LEVEL 7 | | | |
|---|---|---|---|
| 55 | 54 | 52 | 50 |
| 51 | 49 | 53 | 56 |
| 52 | 50 | 55 | 54 |
| 53 | 56 | 51 | 49 |

FIG. 7

| THRESHOLD LEVEL 1 | | | | THRESHOLD LEVEL 6 | | | | THRESHOLD LEVEL 11 | | | |
|---|---|---|---|---|---|---|---|---|---|---|---|
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
|---|---|---|---|---|---|---|---|---|---|---|---|
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
|---|---|---|---|---|---|---|---|---|---|---|---|
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
|---|---|---|---|---|---|---|---|---|---|---|---|
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
|---|---|---|---|---|---|---|---|---|---|---|---|
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

FIG. 8

HALFTONE DOT ARRANGEMENT IN GRAY LEVEL HALFTONE PRINTING

This invention is related to the following applications, filed on even date with the present application: Ser. No. 07/894,858, for Classification to Change Exposure Within a Cell of Different Pixels; Ser. No. 07/894,859, for A Method and Arrangement For Providing a Default Mode in Digital Copying; Ser. No. 07/895,555, for A Method and Arrangement For Locally Switching Gray Dot Types to Reproduce an Image With Gray Level Printing; Ser. No. 07/895,986, for An Image Processing Method to Remove Halftone Screens; Ser. No. 07/895,985, for Multi-Bit Rendering Method and Arrangement for Continuous Tone Picture Representation and Printing; Ser. No. 07/895,554, for A Method and Apparatus for Imbedding Controlled Structure For Gray Scale Rendering; and Ser. No. 07/895,988, for Line Screen Design for Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to selecting a dot type in a display or printing arrangement that uses gray level display/printing.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a $j \times k$ matrix of sub-elements where $j$ and $k$ are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. No. 4,680,645 for a method of rendering gray scale images with variable dot sizes.

There are two major concerns in rendering a continuous tone image for printing: (1) the resolution of image details, and (2) the reproduction of gray scales. In a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of 1 bit/pixel to 16 different dot-sizes of 4 bit/pixel. An image could then be rendered with 133 line screens and 128 gray scales of higher quality image. Although providing higher image quality with respect to line resolution and tonal scales, gray level halftoning presents its own dot rendering issues.

A problem exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily.

There is a need for a dot rendering technique that takes advantage of the line resolution and tonal scales provided by gray level halftoning in reproducing images.

SUMMARY OF THE INVENTION

This and other needs are met by the present invention which provides an arrangement for reproducing an original image, comprising a scanner which scans and digitizes the original image into pixels, a controller coupled to the scanner to receive the digitized original image, and which produces a first signal corresponding to a gray level halftoned representation of the digitized original image, and a printer coupled to the controller to receive said first signal and which produces a gray level halftoned reproduction of the original image. The controller groups the pixels into cells that each have a determined cell gray level, and controls the formation of dots within the pixels of an individual cell by the printer such that for each increase in cell gray level, a dot at at least one of said pixels in the cell forms to a larger dot-size. Sequential forming of the dots occurs at the pixels in the cell in a pre-defined order such that each dot is formed to a first dot-size less than a maximum dot-size before beginning the formation of a dot at another pixel within the cell. When all of the dots in the cell have been formed to the first dot-size corresponding to a specific cell gray level, the dot-size of each of the dots is increased in the pre-defined order to a second dot-size, corresponding to increasing cell gray levels.

The earlier stated need is also met by a method, according to an embodiment of the present invention, of producing gray level halftone screens. This method includes the steps of controlling a gray level printhead such that the printhead forms dots on a recording medium at pixel locations, the pixel locations being grouped into cells having cell gray levels. The dots of a cell are formed such that for each increase in cell gray level, a dot at at least one of the pixels in the cell forms to a larger dot-size. The dots are sequentially formed at the pixels in the cell in a pre-defined order such that each dot is formed to a first dot-size less than a maximum dot-size before beginning the formation of a dot at another pixel within the cell. When all of the dots in the cell have been formed to the first dot-size corresponding to a specific cell gray level, the dot-size of each of the dots is increased in the pre-defined order to a second dot-size, corresponding to increasing cell gray levels.

The apparatus and method described above provide what is termed "mixed" dot type printing, in which gray level dots are formed by constraining the growth of all of the dots in a cell to a first size somewhat smaller than the maximum dot-size, but completing the growth of each dot in the cell to this size before starting to form another dot in the cell. This is a "full" dot approach. When each of the dots in the cell have reached this first size, then for increasing gray levels, the cells grow in a "partial" dot approach, so that all of the dots in the cell grow to a next larger dot-size before any of the dots grow to a still larger dot-size. The combination of the full dot and the partial dot approaches into the mixed dot approach provides stable dots with less granularity (full dot characteristics) and with adequate image detail (partial dot characteristics). This mixed dot approach provides a method for excellent reproduction of images by gray level halftone printing.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates an exemplary 3-bit gray halftone dot layout according to a full dot type embodiment of the present invention.

FIG. 6 shows a 3-bit gray halftone dot layout according to a partial dot type embodiment of the present invention.

FIG. 7 shows a 3-bit gray halftone dot layout according to a mixed dot type embodiment of the present invention.

FIG. 8 shows a 4-bit gray halftone dot layout according to a mixed dot type embodiment of the present invention.

DETAILED DESCRIPTION OF THE DRAWINGS

Figures 1, 2:
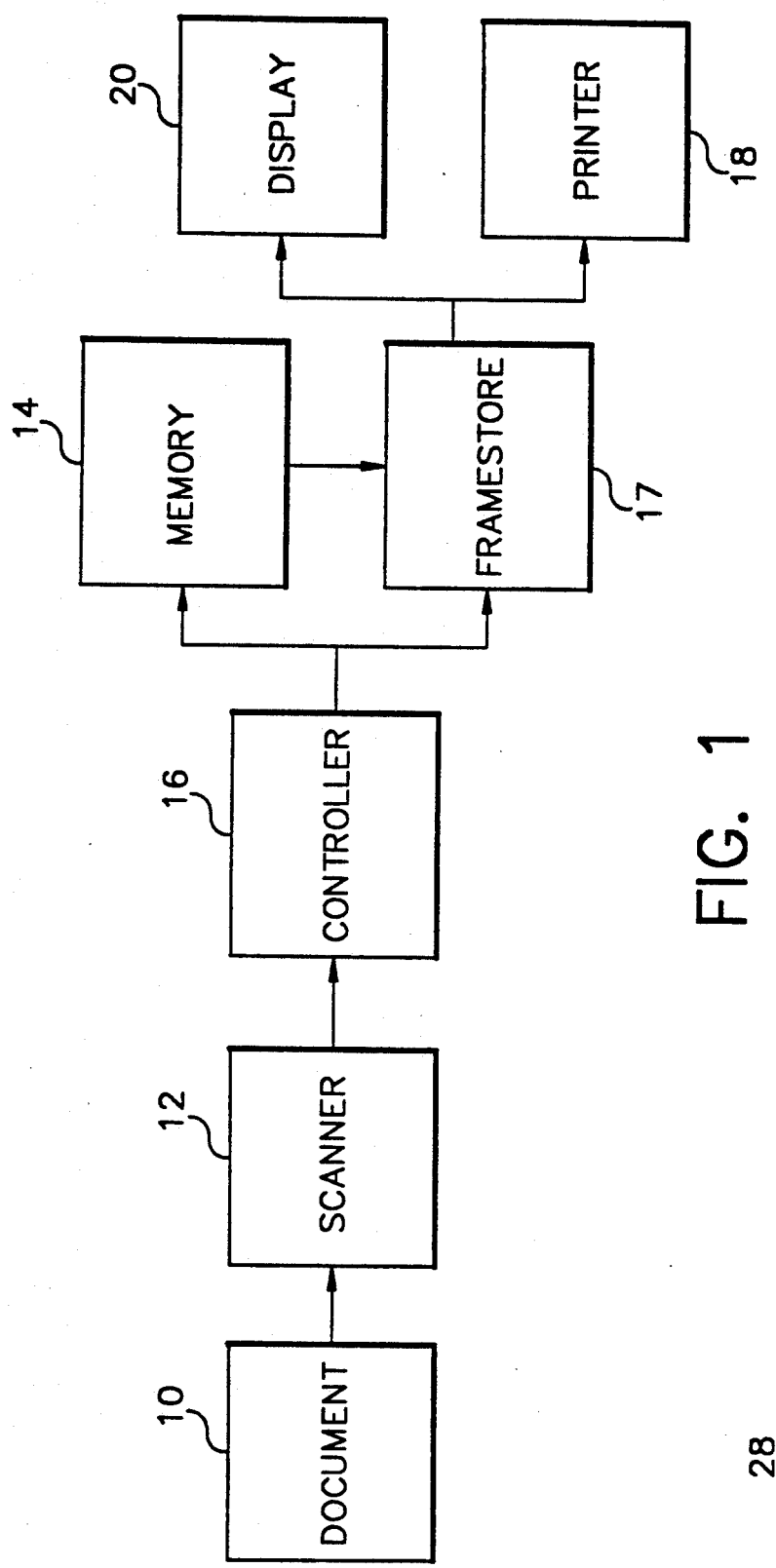
FIG. 1 shows a block diagram of an arrangement for reproducing an image, constructed in accordance with an embodiment of the present invention.
FIG. 2 shows an example of a 4×4 cell with indications of gray level for each pixel.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

In gray level printing, each pixel has the capability to render several different dot sizes, and thus different gray levels. However, instead of simply providing each pixel with an independent gray level, several pixels may be organized together to form a super-pixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 28 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary eight element cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this pixel grows larger and larger as the levels increase from level 1 to level 2 all the way to level 7. One can see that this circled pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. At gray level 7, the circled pixel has reached its maximum dot-size, so that a dot at another pixel must now start forming. This dot starts forming at the pixel indicated with a square around it in level 1, with the numeral 8.

Figures 4, 5:
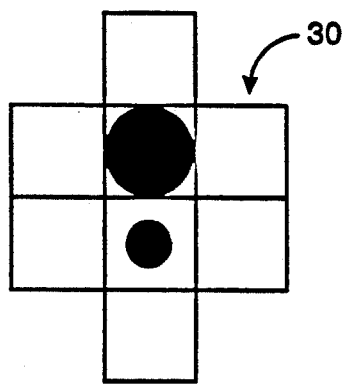
FIG. 4 shows a cell with dots that have been formed.
FIG. 5 illustrates an exemplary halftone dot mask.

The dot formation process continues, with the dot at this second pixel growing larger and larger as the levels again increase from level 1 to level 5. The formation process stops at level 5, since the pixel has now reached the value of 12. The halftone cell 30 now contains, as seen in FIG. 4, a dot of dot-size 7, and a dot of dot-size 5. The extension of this formation process to 57 gray levels is easy to see from this example.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of 1. The pixels indicated with a square around them in level 2 would be built up to have a dot-size of 2.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have attained a dot-size of 5, corresponding to gray level 40, the cell then increases in gray level by using a partial dot type process. In other words, each of the pixels in the cell must grow to a dot-size of 6 before any of the pixels begins growing to a dot-size of 7.

An example of a 4-bit gray halftone dot layout for mixed dot type is illustrated in FIG. 8. The formation of the dots is the same in concept to that illustrated in FIG. 7. Because there are 15 dot sizes available for each pixel, 121 gray levels for an eight element cell are obtainable.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An apparatus for reproducing an original image, comprising:
   a scanner which scans and digitizes the original image into pixels;
   a controller means coupled to the scanner to receive the digitized original image, and which produces a first signal corresponding to a gray level halftoned representation of the digitized original image; and
   a printer coupled to the controller to receive said first signal and which produces a gray level halftoned reproduction of the original image;
   wherein the controller means groups the pixels into cells that each have a determined cell gray level, and controls the formation of dots within the pixels of an individual cell by the printer such that for each increase in cell gray level, a dot at at least one of said pixels in the cell forms to a larger dot-size, with sequential forming of dots occurring at the pixels in the cell in an order such that each dot is formed to a first dot-size, larger than a minimum dot size but less than a maximum dot-size, before beginning the formation of a dot at another pixel within the cell, and when all of the pixels in the cell have been formed to the first dot-size corresponding to a specific cell gray level, providing further sequential increases in cell gray levels by correspondingly sequentially increasing the dot-size of each of the dots in said cell to a second dot-size, to provide progressive corresponding increases in cell gray levels by distributing said increases successively to different pixels in the cell.

2. A method of producing gray level halftone screeens, comprising:
   controlling a gray level printhead such that the printhead forms a dot of variable dot size on a recording medium at each of plural pixel locations, the pixel locations being grouped into cells having cell gray levels, wherein the dots of a cell are formed such that for each increase in cell gray level, a dot at at least one of said pixels in the cell forms a larger dot-size;
   sequentially forming the dots at the pixels in the cell in an order such that each dot is formed to a first dot-size, larger than a minimum dot size but less than a maximum dot-size before beginning the formation of a dot at another pixel within the cell;
   when all of the dots have been formed to the first dot-size corresponding to a specific cell gray level, providing further sequential increases in cell gray levels by correspondingly sequentially increasing the dot-size of each of the dots to a second dot-size, to provide corresponding increases in cell gray levels by distributing said increases successively to different pixels in the cell.

* * * * *